United States Patent [19]
Marsch

[11] 3,881,584
[45] May 6, 1975

[54] BALANCE SPRING FOR CENTRIFUGAL HEAD IN HYDRAULIC CYLINDER

[75] Inventor: James E. Marsch, Brookfield, Wis.

[73] Assignee: Allis-Chalmers Corporation, Milwaukee, Wis.

[22] Filed: Dec. 17, 1973

[21] Appl. No.: 425,534

[52] U.S. Cl. ................... 192/85 AA; 192/70.28
[51] Int. Cl. ............................................ F16d 25/00
[58] Field of Search ........... 192/85 AA, 89 B, 18 A, 192/70.28, 87.15, 87.16, 87.17; 188/72.4, 366

[56] References Cited
UNITED STATES PATENTS

| | | | |
|---|---|---|---|
| 2,002,367 | 5/1935 | Farney | 192/85 AA |
| 2,095,094 | 10/1937 | Glasner | 192/18 A |
| 2,195,663 | 4/1940 | Wolfram | 192/70.28 |
| 2,240,219 | 4/1941 | Lambert | 188/366 X |
| 2,324,613 | 7/1943 | Criley | 192/70.28 |
| 2,511,520 | 6/1950 | Walton | 192/85 AA |
| 3,730,314 | 5/1973 | Herr et al. | 192/18 A |
| 3,805,632 | 4/1974 | Prokop | 192/87.17 X |

FOREIGN PATENTS OR APPLICATIONS

| | | | |
|---|---|---|---|
| 664,013 | 8/1938 | Germany | 192/87.17 |
| 1,400,409 | 2/1969 | Germany | 192/85 AA |

*Primary Examiner*—Benjamin W. Wyche
*Attorney, Agent, or Firm*—Arthur L. Nelson

[57] ABSTRACT

Retraction springs on an annular hydraulic cylinder for overcoming the hydraulic head in a hydraulic cylinder due to centrifugal forces generated by the rotating clutch assembly.

10 Claims, 2 Drawing Figures

BALANCE SPRING FOR CENTRIFUGAL HEAD IN HYDRAULIC CYLINDER

This invention relates to hydraulic clutches and more particularly to retraction means on the hydraulic piston to overcome the hydraulic head in the hydraulic cylinder due to centrifugal forces built up in the rotating clutch assembly.

Hydraulic actuators used to engage a hydraulically actuated clutch are usually mounted radially from the center of the rotating clutch assembly. The hydraulic actuator carries hydraulic fluid which rotates about the center thereby creating centrifugal forces in the hydraulic fluid. As the hydraulic clutch is released the fluid pressurized in the hydraulic actuator due to the actuating pressure transmitted from the hydraulic control valve is released. There is, however, a residual pressure in this type of a rotating clutch assembly since the centrifugal force on the fluid is not released. In the past a centrifugal relief valve was often used to release the pressure in the rotating clutch assembly. While this is satisfactory in many instances, the relief valve occasionally may not release and accordingly the drag on the clutch will be maintained, which is objectionable since the drive through the clutch is partially maintained.

Accordingly, this invention provides and alternate means of compensating for the pressure in the hydraulic actuator of the rotating clutch assembly. This is accomplished by providing retraction means for retracting the piston and disengaging the friction discs which are interconnected between the rotating clutch drum and the clutch hub for transmission of power. The retraction means must be of sufficient size to retract the piston against any residual pressure in the hydraulic actuator and to balance or negate the clutch engaging force caused by centrifugal force on oil in the rotating clutch assembly thereby contributing to a smooth and even clutch engagement. This invention provides for an external positioning of the retraction means to retract the piston in the hydraulic actuator and thereby release the clutch.

It is an object of this invention to provide a retraction means on the piston in the hydraulic actuator of a rotating clutch assembly.

It is another object of this invention to provide a retraction means on the piston in the hydraulic actuator of a rotating clutch assembly to overcome the pressure caused by the centrifugal forces in the rotating clutch assembly.

It is a further object of this invention to provide retraction means on the piston of a hydraulic actuator to retract the piston by overcoming a hydraulic head in the hydraulic actuator due to centrifugal forces produced in the rotating clutch assembly.

The objects of this invention are accomplished in an annular hydraulic cylinder and piston in a rotating clutch assembly. Angularly spaced on the hydraulic cylinder are a plurality of retraction springs on the outside of the hydraulic cylinder. Means are provided for connecting the retraction springs to the hydraulic piston to retract the piston when the clutch is released. The retraction springs are mounted externally of the hydraulic cyclinder and have sufficient force to counteract the pressure in the hydraulic actuator due to the centrifugal forces in the rotating clutch assembly produced on the hydraulic fluid to thereby retract the piston and release the hydraulic clutch when the operator opens the actuating valve for the clutch assembly.

The preferred embodiment of this invention is illustrated in the attached drawings.

Figure 1:
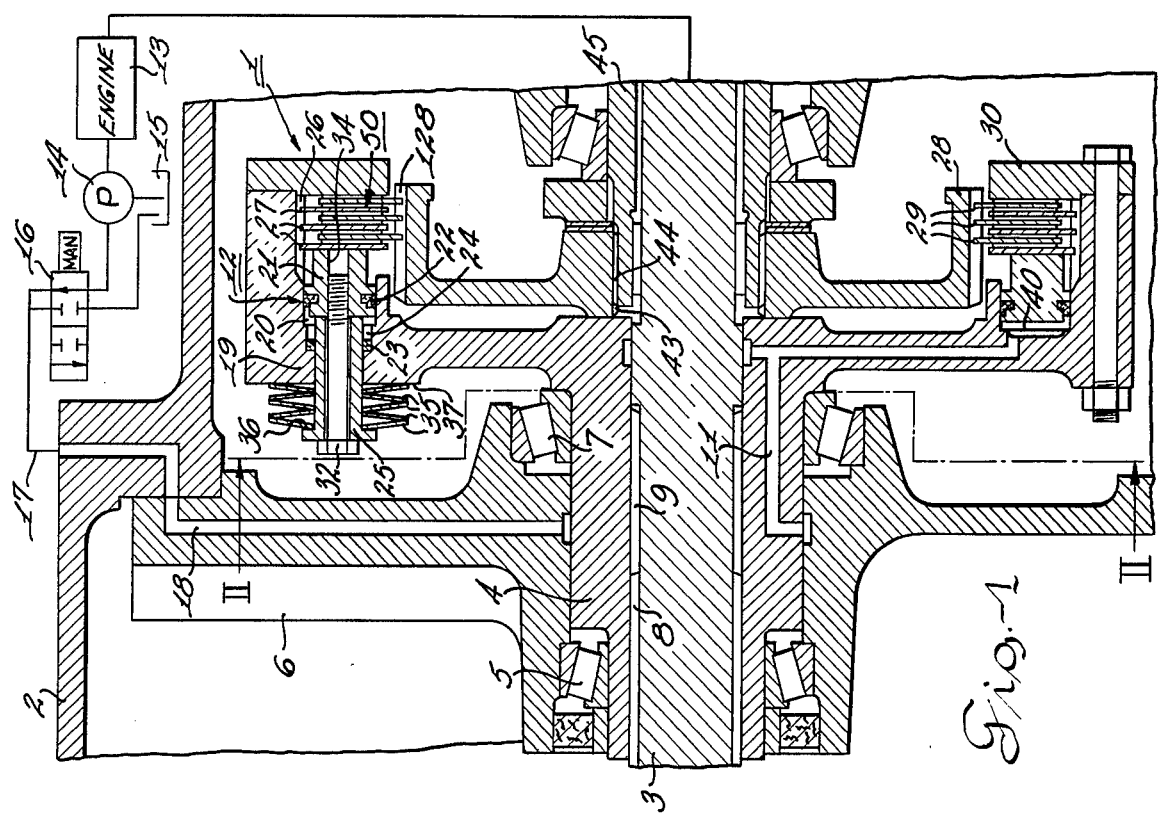
FIG. 1 illustrates a cross section view of the rotating hydraulic fluid clutch assembly taken on line I—I of FIG. 2.
Figure 2:
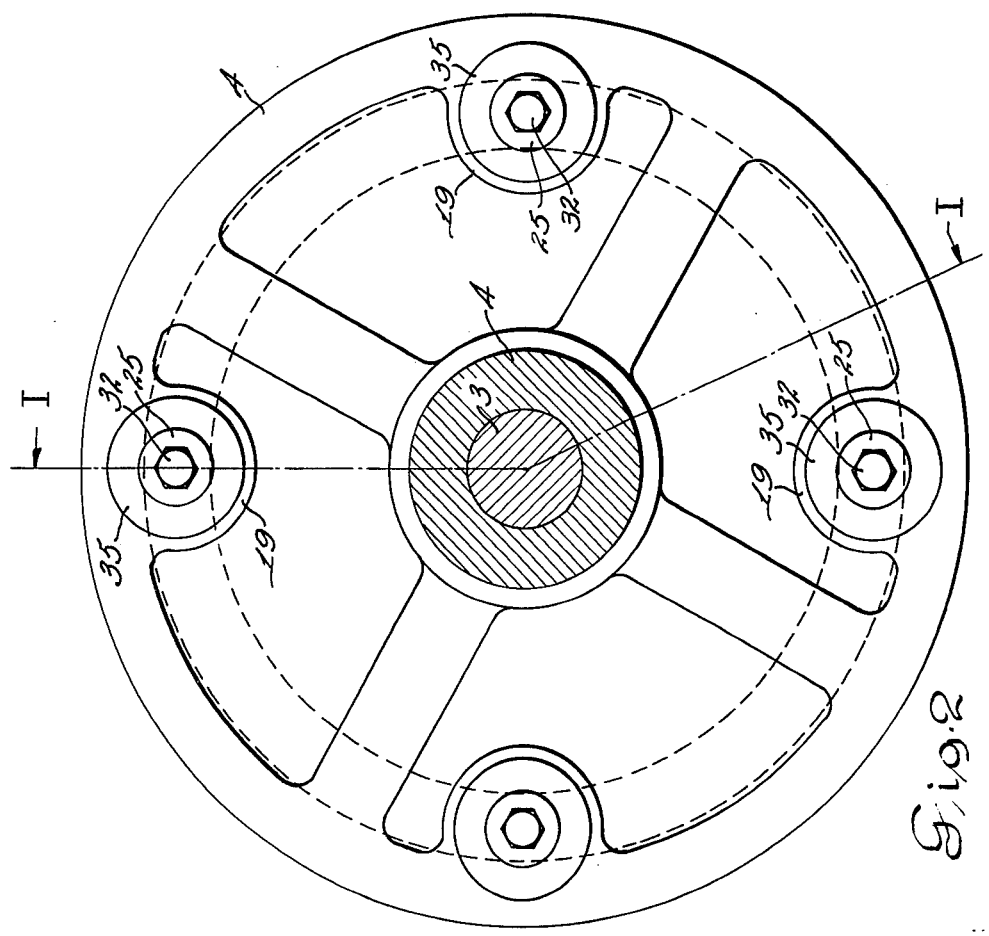
FIG. 2 is a cross section view taken on line II—II of FIG. 1.

Referring to the drawings, FIG. 1 illustrates the rotating clutch assembly 1 within the clutch housing 2. The drive shaft 3 drives the clutch drum 4 which is rotatably mounted on the bearing 5 and 7. The bearing 5 is received within the bearing support 6 which also receives the bearing assembly 7. Bearing support 6 is suitably fastened to the clutch housing 2 to provide a rotating support for the clutch assembly 1.

The drive shaft 3 is formed with external spline 8 which engages the internal spline 9 of the clutch drum 4. Fluid passages 11 are formed in the clutch drum 4 to supply pressurized fluid to the hydraulic actuator 12 and the rotating clutch assembly 1.

The engine 13 drives the drive shaft 3 and also drives the hydraulic fluid pump 14. The pump 14 receives fluid from the reservoir 15 and pressurizes fluid which is supplied to the control valve 16. The conduit 17 transmits the pressurized fluid from the valve 16 to the passage means 18 in the housing 2.

The hydraulic actuator 12 includes a hydraulic cylinder 19 formed by the drum 4. The hydraulic cylinder 19 forms the pressurizing fluid chamber 20 with the piston 21. The piston 21 carries the seal 22. The seal 23 is positioned in the seal chamber 24 on a spring retainer 25.

The piston 21 reciprocates within the hydraulic cylinder 19. The clutch drum 4 is provided with an internal spline 26 which carries the clutch discs 27. The hub 28 carries the clutch discs 29 on its external spline 128. The clutch assembly 1 is a multiple disc clutch assembly and the clutch discs 27 and 29 frictionally engage each other when the piston 21 compresses the disc stack 50. The reaction plate 30 is connected to the end of the drum 4.

The spring retainer 25 receives the bolt 32 which threadedly engages the threaded opening 34 of the piston 21. A plurality of Belleville springs 35 are compressively positioned between the shoulder 36 of the spring retainer 25 and the radial facing 37 of the cylinder 19. The hydraulic actuator as shown in FIG. 1 is in the actuated position in which the friction materials on the discs 27 and 29 are frictionally engaging each other. The piston 21 in its retracted position engages the end wall 40 in the hydraulic cylinder 19 in its retracted position.

The clutch hub 28 has an internal spline connection 43 which engages external spline 44 on the quill shaft 45. Quill shaft 45 drives the vehicle through suitable power driving means.

The operation of the device will be described in the following paragraphs.

The pump 14 pressurizes fluid from the reservoir 15 which is supplied to the control valve 16. The control valve 16 transmits pressurized fluid to the conduit 17 and the passages 18 and 11 to operate the hydraulic actuator 12 as shown in FIG. 1. As pressurized fluid is supplied to the pressurized fluid chamber 20 the piston 21 moves in the right-hand direction to compress the disc stack 50. As the disc stack 50 is compressed the disc 27 transmits power to the disc 29 to drive the quill shaft 45. As the hydraulic actuator 12 is actuated the springs 35 are compressed due to the pressurized fluid in the chamber 20.

As the valve 16 is moved to the right, the pressurized fluid in the hydraulic fluid pressurizing chamber 20 is released and a portion of the fluid is permitted to return through the passages 11 and 18 to sump 15. A certain amount of residual pressure is retained in the hydraulic fluid actuator 12 due to the centrifugal force of the rotating clutch assembly 1. This force tends to retain the hydraulic fluid clutch assembly 1 in the actuated position even though the pressure in the passage 11 is released. Accordingly, the Belleville springs 35 expand carrying the spring retainer 25 and the bolt 32 to retract the piston 21. The force of the springs 35 is sufficient to overcome the residual pressure of the fluid in the chamber 20 due to the centrifugal forces in the rotating clutch assembly 1. This, in turn, completely releases the clutch assembly and the clutch discs 27 and 29 are no longer engaging each other. Accordingly, power transmission through the clutch assembly is interrupted.

The Belleville springs 35 are under compression in their retracted position to overcome any residual pressure in the hydraulic chamber 20. The force produced by the compression springs 35 can be controlled by the number of springs placed in the assembly and also by the length of the spring retainer 25. The force of the springs must be adequate to retract the piston to prevent engagement of the friction discs due to centrifugal forces on the fluid column in the passage 11 and the hydraulic fluid pressurizing chamber 20.

The embodiments of the invention in which an exclusive property or privilege is claimed are defined as follows:

1. A hydraulic clutch assembly comprising a rotating clutch drum carrying a plurality of clutch discs and defining an axis of rotation, a hydraulic cylinder defined by said rotating clutch drum radially spaced from said axis of rotation, a clutch hub carrying a plurality of clutch discs for engagement with the clutch discs on said drum, a hydraulic piston in said hydraulic cylinder forming a fluid pressurizing chamber for receiving pressurized hydraulic fluid for frictionally engaging said discs when actuating said hydraulic clutch assembly, retraction means for retracting said hydraulic piston including means defining an opening axially parallel with said axis of rotation extending into said pressurizing chamber through a wall in said hydraulic cylinder, a piston retracting sleeve removably received in said opening and firmly seated on said piston in said pressurizing chamber, a removable fastening member extending axially through said sleeve firmly seating said sleeve on said piston, resilient retracting means including a selective plurality of spring elements in axial adjoining engagement mounted externally on said hydraulic cylinder and compressively engaging a seating surface on said piston retracting sleeve and an external surface of said hydraulic cylinder providing a selective retractive force for retracting said piston and overcoming the effect of residual fluid pressure in the hydraulic fluid pressurizing chamber when the hydraulic clutch assembly is released.

2. A hydraulic clutch assembly as set forth in claim 1 wherein said hydraulic piston and said hydraulic cylinder define an annular hydraulic pressurizing chamber.

3. A hydraulic clutch assembly as set forth in claim 1 wherein said spring elements include axially aligned compression springs.

4. A hydraulic clutch assembly as set forth in claim 1 wherein said spring elements includes Belleville springs.

5. A hydraulic clutch assembly as set forth in claim 1 wherein said piston retraction sleeve includes a radial flange for engaging said spring elements, said fastening means defines a bolt extending through said retraction sleeve and removably connected to said hydraulic piston for adjustably setting the retraction force of said spring elements.

6. A hydraulic clutch assembly as set forth in claim 1 wherein said means defining an opening means in said hydraulic cylinder defines axial openings angularly spaced around the center of said rotating clutch drum.

7. A hydraulic clutch assembly as set forth in claim 1 including means rotatably supporting said clutch drum about a central rotating axis, a plurality of said retracting sleeves in said retraction means angularly spaced about said central rotating axis of said clutch drum.

8. A hydraulic clutch assembly as set forth in claim 1 wherein said hydraulic cylinder and hydraulic piston define an annular hydraulic clutch actuator, said retraction means include a plurality of said retracting sleeves defining shoulders for engaging said spring elements angularly spaced on said hydraulic piston for retracting said piston in said hydraulic cylinder.

9. A hydraulic clutch assembly as set forth in claim 1 wherein said clutch drum defines a bell housing forming said hydraulic cylinder, a plurality of retracting members defining said retraction means angularly spaced on said bell housing for retracting said piston in said hydraulic cylinder.

10. A hydraulic clutch assembly as set forth in claim 1 wherein said clutch drum defines radial passages for supplying pressurized fluid to said pressurizing fluid chamber for actuating said hydraulic clutch.

* * * * *